United States Patent [19]
Barrett

[11] Patent Number: 5,610,907
[45] Date of Patent: Mar. 11, 1997

[54] ULTRAFAST TIME HOPPING CDMA-RF COMMUNICATIONS: CODE-AS-CARRIER, MULTICHANNEL OPERATION, HIGH DATA RATE OPERATION AND DATA RATE ON DEMAND

[76] Inventor: Terence W. Barrett, 1453 Beulah Rd., Vienna, Va. 22182

[21] Appl. No.: 282,290

[22] Filed: Jul. 29, 1994

[51] Int. Cl.⁶ ..................................................... H04J 13/00
[52] U.S. Cl. .......................... 370/342; 375/203; 375/207
[58] Field of Search .................................. 370/18, 19, 20, 370/21, 85.13, 8, 9, 10, 84; 375/215, 200, 202, 203, 206, 207, 208, 237, 238, 239, 242, 241, 254, 256, 257; 34/56; 342/27; 348/6, 7, 8, 9; 371/5.1, 5.2, 37.4, 37.2, 37.1, 37.7, 64

[56] References Cited

U.S. PATENT DOCUMENTS

| 3,728,632 | 4/1973 | Ross | 375/256 |
|---|---|---|---|
| 4,641,317 | 2/1987 | Fullerton | 375/200 |
| 4,743,906 | 5/1988 | Fullerton | 342/27 |
| 4,813,057 | 3/1989 | Fullerton | 375/259 |
| 4,979,186 | 12/1990 | Fullerton | 375/239 |
| 5,377,225 | 12/1994 | Davis | 370/205 |

OTHER PUBLICATIONS

Albicki, A., Kinnen, E., Sobski, A., Titlebaum, E. & Wronski, L. D., Transmitter and receiver design for pilot project, Phase 1, *Technical Report #1, for Rochester Gas and Electric Corporation*, Jun., 1992.

Bellegarda, J. R. & Titlebaum, E. L., Time–frequency hop codes based upon extended quadratic congruences, *IEEE Trans. on Aerospace & Electronic Systems*, 24, 726–742, 1988.

Bellegarda, J. R. & Titlebaum, E. L., The hit array: and analysis formalism for multiple access frequency hop coding, *IEEE Trans. on Aerospace & Electronic Systems*, 27, 30–39, 1991a.

Bellegarda, J. R. & Titlebaum, E. L., Amendment to Time–frequency hope codes based upon extended quadratic congruences, *IEEE Trans. on Aerospace & Electronic Systems*, 27, 167–172, 1991b.

Drumheller, D. M. & Titlebaum, E. L., Cross–correlation properties of algebraically constructed Costas arrays, *IEEE Trans. on Aerospace & Electronic Systems*, 27, 2–10, 1991.

(List continued on next page.)

*Primary Examiner*—Douglas W. Olms
*Assistant Examiner*—Dang Ton
*Attorney, Agent, or Firm*—Jim Zegeer, Esq.

[57] ABSTRACT

An ultrashort pulse time hopping code-division-multiple-access (CDMA) RF communications system in the time-frequency domain comprises a transmitter including a short duration pulse generator for generating a short duration pulse in the picosecond to nanosecond range and a controller for controlling the generator, code means connected to the controller for varying the time position of each short pulse in frames of pulses in orthogonal superframes of ultrafast time hopping code division multiple access format, precise oscillator-clock for controlling such timing, encoding modems for transforming intelligence into pulse position modulation form, antenna/amplifier system. A homodyne receiver is provided for receiving and decoding the coded broadcast signal, and one or more utilization devices are connected to the homodyne receiver. Preferably, the codes are orthogonal codes with the temporal coding of the sequence of ultrafast, ultrawideband pulses constituting the carrier for transmission by the antenna system. The homodyne receiver includes a bank of decoder/modems, an acquisition system/matched filter for synchronizing to a superframe transmission, identifying coded sequencers in the superframe and assigning the transmissions to a selected decoder/modem on the basis of code recognition. The system is adapted for multichannel operation and provides a high overall data rate in the 500 mbs range for maximum multichannel operation.

10 Claims, 10 Drawing Sheets

OTHER PUBLICATIONS

Fullerton, L. W. & Phillips, C. A., Spread spectrum radio transmission system, U.S. Patent 4,641,317 dated Feb. 3, 1987.

Fullerton, L. W. & Phillips, C. A., Time domain radio transmission system. U.S. Patent 4,743,906 dated May 10, 1988.

Fullerton, L. W. & Phillips, C. A., Time domain radio transmission system. U.S. Patent 4,813,057 dated Mar. 14, 1989.

Fullerton, L. W., Time domain radio transmission system. U.S. Patent 4,979,186, 1990.

Kostic, Z., Titlebaum, E. L. & Maric, S. V., The design of new optical codes and time–hopping patterns for synchronous spread–spectrum code–division multiple–access communication system. *ICC'91*, 20.2.1, 0585–0589, 1991.

Maric, S. V. & Titlebaum, E. L., A class of frequency hop codes with nearly ideal characteristics for use in multiple–access spread–spectrum communications and radar and sonar systems, *IEEE Trans. on Comm.*, 40, 1442–1447, 1992.

Robbins, K. W., Short baseband pulse receiver. U.S. Patent 3,662,316 dated May 9, 1972.

Robbins, K. W. & Robbins, G. F., Stable base–band super-regenerative selective receiver, U.S. Patent 3,794,996 dated Feb. 26, 1974.

Ross, G. F., Transmission and reception system for generating and receiving base–band duration pulse signals for short base–band pulse communication. U.S. Patent 3,728,632 dated Apr. 17, 1973.

Ross, G. F. & Lamensdorf, D., Balanced radiation system, U.S. Patent 3,659,203 dated Apr. 25, 1972.

Ross, G. F. & Robbins, K. W., Narrow range–gate baseband receiver. U.S. Patent 4,695,752 dated Sep. 22, 1987.

Titlebaum, E. L., Time–frequency hop signals Part I: Coding based upon the theory of linear congruences, *IEEE Trans. on Aerospace & Electronic Systems*, AES–17, 490–493, 1981.

Titlebaum, E. L. & Sibul, L. H., Time–frequency HOP signals Part II: Coding based upon quadratic congruences. *IEEE Trans. on Aerospace & Electronic Systems*, AES–17, 494–500, 1981.

Titlebaum, E. L., Maric, S. V. and Bellegarda, J. R., Ambiguity properties of quadratic congruential coding. *IEEE Trans. on Aerospace & Electronic Systems*, 27 18–29, 1991.

OSCILLATOR ACCURACY: >250 PICOSEC.S IN 1 MSEC, OR ABOUT 250 PARTS in 10^9.

PREAMPLIFIER: 40 DB GAIN MAX; NO AGC; NOISE FIGURE: 5 DB; BANDWIDTH: 4 GHZ.

ULTRAFAST TIME HOPPING CDMA-RF COMMUNICATIONS: CODE-AS-CARRIER, MULTICHANNEL OPERATION, HIGH DATA RATE OPERATION AND DATA RATE ON DEMAND

BACKGROUND AND BRIEF DESCRIPTION OF THE INVENTION

The present invention relates generally to wireless RF time hopping code-division-multiple-access (CDMA) spread spectrum communications systems, and specifically to ultrafast systems, which use individual ultrashort pulses (monocycle) signals in the picosecond ($10^{-12}$) to nanosecond ($10^{-9}$) range. Such ultrashort pulsed (monocycle) signals can also be very wide in instantaneous bandwidth. Before transmission and after reception, the system functions as a digital communications system. The carrier for such wireless communications systems is neither a frequency, amplitude, phase nor polarization carrier, but is due to the precise timing arrangements in a sequence of individual pulses provided by the digital coding schemes.

Whereas most wireless RF communications systems in the art use frequency-domain receiver designs based on the heterodyne, or super heterodyne principle, the receiver of the present invention is a time-domain homodyne receiver. Whereas prior art uses coding, e.g., in direct sequencing or frequency hopping, to achieve spreading and despreading of the signal with resultant processor gain, the present invention uses an ultrashort pulse as an individual signal always spread over a very wide bandwidth, as well as coding which determines the timing of such individual pulses within a sequence. Information is carried in a transmission by the pulse position modulation technique, i.e., by precise microdeviation from the pulse sequence timing set by the channel code.

Due to the use of orthogonal coding schemes and the use of ultrafast pulse sequence techniques, it is possible to provide extremely high data rate wireless point-to-point communications, as well as wide-area voice and data communications.

Accordingly, it is an object of the present invention to significantly increase the data rate of wireless RF communications by using orthogonal coding schemes in ultrafast time hopping CDMA communications both in point-to-point and broadcast mode.

It is a further object of the invention to provide a communications system which can coexist without interfering with, or causing interference to conventional RF transmissions or other ultrafast time hopping CDMA users.

It is a further object of the invention to provide a wireless communications system which can interface with digital, e.g., optical fiber, communications systems.

It is a further object of the invention to provide a communications system which is robust against environmental notched filtering of frequency components in the transmitted signal.

It is a further object of the invention to provide a communications system which has substantial range at modest power, is small in size, weight and is not costly to manufacture.

SUMMARY OF THE INVENTION

Briefly, the above and other objects of the present invention are achieved in an RF ultrafast time hopping CDMA wireless communications system, which uses individual pulses in a sequence of such pulses, those individual pulses being so short in duration (e.g., in the picosecond and nanosecond range) that the individual pulse signal energy is spread over very many frequencies simultaneously or instantaneously (instead of sequentially). A time hopping sequential code is also used to position these pulses precisely in sequence providing optimum use of time-frequency space and also providing noninterfering transmission channels due to the orthogonality of the coding schemes used.

The ultrashort nature of the individual pulses used also permits the time duration of a frame to be divided into very many microintervals of time in which the signal could occur. This division into very many microintervals in a frame permits the availability of many possible coding schemes as well as many noninterfering transmission channels. Thus the ultrashort nature of the individual pulses, together with orthogonal coding schemes, permits the highest multichannel data rates of any wireless communications system.

In one embodiment of the present invention a communications system uses: (i) orthogonal codes which can be slaved to a single acquisition system/matched filter and which captures and assigns each code to unque decoding modems; (ii) correlators/acquisition systems/matched filters which are able to detect the ultrafast, ultrawideband signals and retain memory of such capture over superframes of the order of a millisecond; (iii) pulsed power sources, antennas, encoding modems, oscillator-clocks, intelligence/data encrypters; and (iv) EPROMs to provide coding information to both encoding and decoding modems.

BRIEF DESCRIPTION OF THE DRAWINGS

The above and other objects, advantages and features of the invention will become more apparent when considered with the following specification and accompanying drawings wherein:

FIG. 10b is a bird's-eye-view of FIG. 10a.

DETAILED DESCRIPTION OF THE PREFERRED EMBODIMENT

Figure 1A:
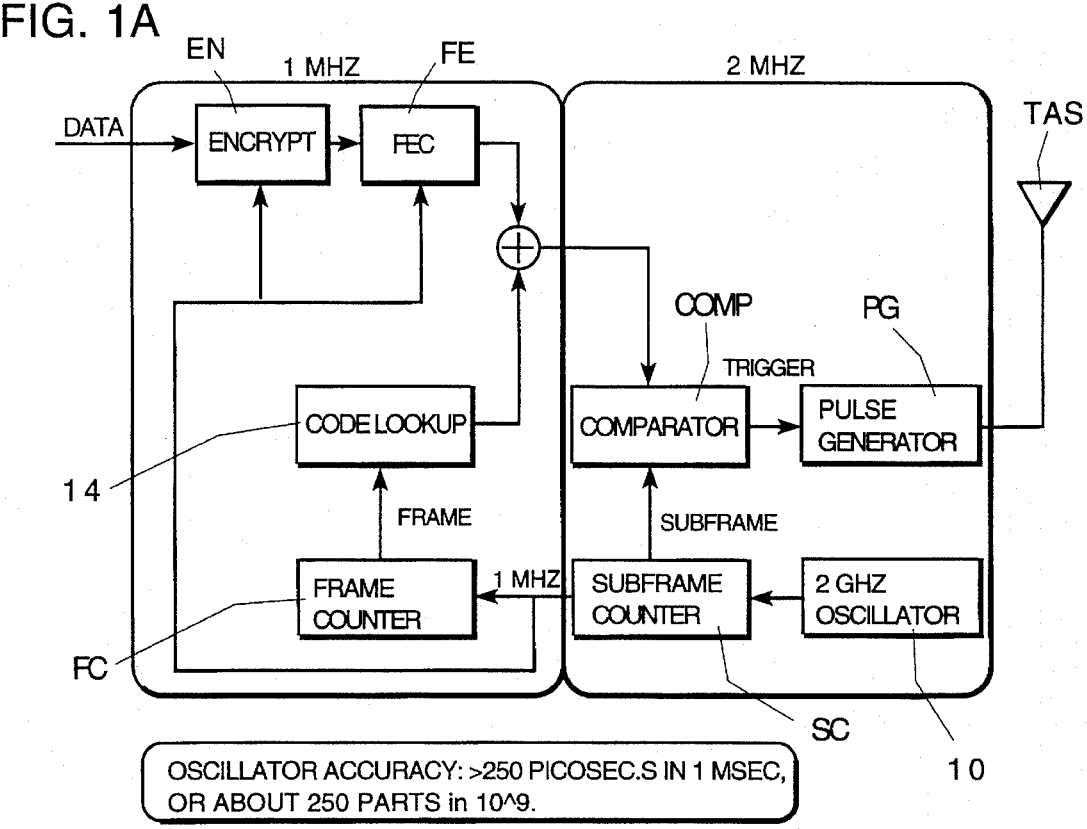
FIG. 1a is a block diagram of a transmitter incorporating the invention configuration for an ultrafast time hopping CDMA wireless communications system.
Figure 1B:
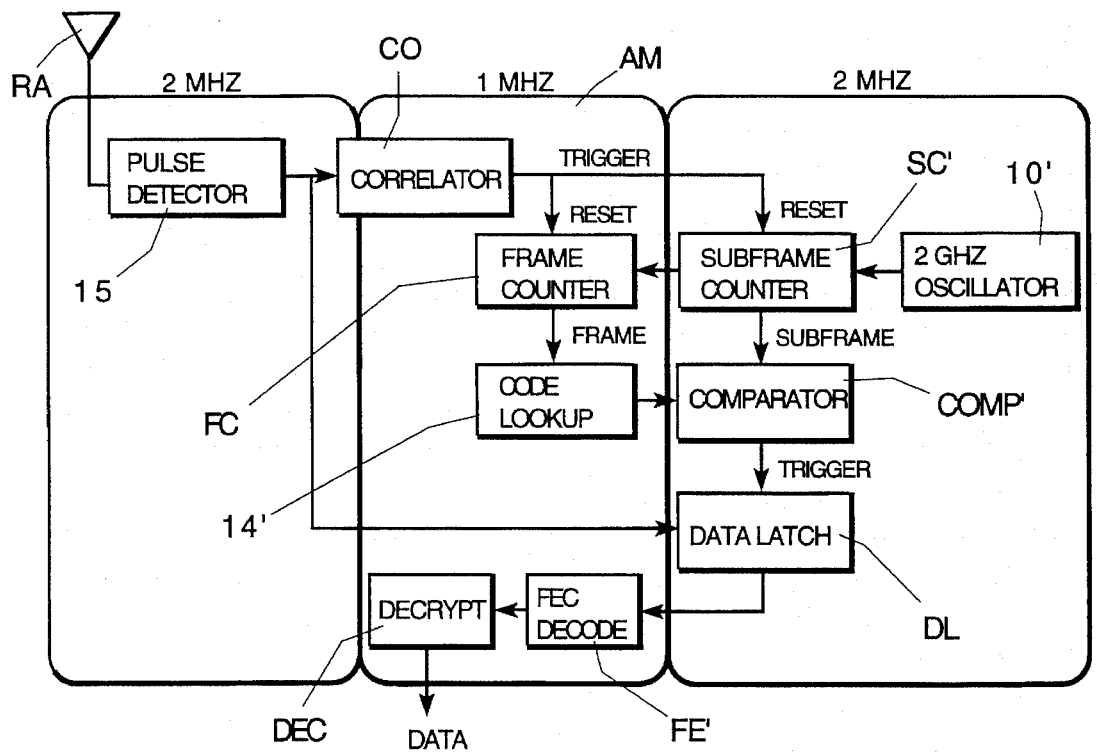
FIG. 1b is a block diagram of a receiver configuration thereof.

In general physical terms the present invention is a system illustrated in FIGS. 1a and 1b. The various component parts are described in the System section and the specifics of the coding schemes are described in the Codes section.

THE SYSTEM

There are many possible embodiments of an ultrafast time hopping CDMA system. The following is an embodiment which permits multichannel (high data rate) use.

1. Oscillator Clock 10, 10'. This circuit can use, e.g., GaAs MMIC technology, or other semiconductor technology, to convert DC power to a 2 GHz signal. The output signal of the oscillator clock will have sufficient power to drive the data gate circuitry and transmitter amplifier (during transmission of a pulse). The oscillator clock is a crucial subcomponent requiring an accuracy >20 picoseconds in 1 msec., or about 20 parts in $10^9$.

The signal can be generated by a voltage-controlled oscillator phase-locked to a frequency stable reference signal.

2. Pulse Emitter and Antenna Module TA. During the transmission of an on-going pulse a sample of the oscillator signal is amplified and transmitted out of the antenna. An RF switching circuit (in pulse generator PG) driven by the comparator COMP trigger permits the oscillator clock to drive the transmitter amplifier chain for the duration of the pulse. The transmitter amplifier chain delivers the resulting RF pulse to the antenna at a power level required by the system.

The amplifier can be, e.g., a cascaded set of GaAs MMIC chips, or other semiconductor technology. The bandwidth and impedance matching of these amplifiers can be achieved by, e.g., a distributed network of parallel MESFETs, or by other semiconductor methods. The input and output parasitic capacitances of the devices is absorbed by series inductances which in effect form a lumped element 50 ohm transmission line.

The antennas per se for both transmit and receive used can either be of the nonresonant kind or nondispersive TEM horn designs. In either case, printed circuit methods can be used to fabricate the antennas on the circuit boards, as well as other methods of fabrication.

3. Acquisition Module AM. The acquisition module can be based on designs using associative string processor technology or other means. This module is described in detail below.

4. Modems/Encoders and Modems/Decoders (Data Gate Circuitry). The data gate circuitry is common to both the transmitter and receiver. It can consist of, e.g., very high precision GaAs digital circuitry, or other semiconductor circuitry. The subframe counter is a free running counter driven by the clock oscillator. The output of the counter is compared to the look-up code corresponding to the frame counter.

The digital gate circuitry can be achieved using, e.g., ECL compatible source coupled logic on GaAs, or other semiconductor technology. Gate length and width can be chosen to reduce the parasitic capacitances such that loaded gate speed of less than 50 picoseconds can be met.

The receiver data gate counters are reset when a transmission is received. A high speed data latch is triggered to capture the output of the pulse detector during the subframes triggered by the code. The output of the data latch contains the transmitted data including error correction which corresponds to the position of the pulse within the subframe.

The transmitter data gate subframe and frame counters are free running. Whenever the subframe counter and codes match the pulse generator is triggered causing a high speed pulse to be transmitted. The pulse position in the subframe corresponds to the data and error correction codes of the least significant bits at the inputs to the Acquisition Module.

5. Code EPROMs (Code Look-up 14, 14'). The code generation function can be performed by EPROMs in code look-up 14, 14' in the transmitter and receiver. Once per frame, a pulse is generated by the frame counter EPROM. The code specifies in which subframe the pulse will occur. With the use of more than one code (data rate on demand) the EPROM will provide more than one code to the transmitter and receiver. Alternatively, phase-shift registers can be used to generate the codes.

6. Pulse Detector (Rise Time Trigger 15). Background interference can be rejected by a rise-time triggering circuit, which is not merely a high pass filter. (An ultrashort pulse with a 4 GHz bandwidth contains extremely low frequency components. Therefore a high pass filter distorts the ultrashort pulse). In order to achieve rise-time triggering, the RF signal can be passed through an envelope detector which is then fed through a high-pass filter before reaching the trigger threshold circuit. The high pass filter then differentiates the envelope and passes transients while rejecting slow changes.

7. Receiver (FIG. 1b). The receiver is a homodyne receiver (not a heterodyne receiver). The receiver preamplifier (not shown) needs a maximum of 40 db gain, no AGC, and a noise figure of approximately 5 db. The bandwidth required is about 4 GHz. The preamplifier of the receiver antenna RA feeds a pulse detector 15 which output and ECL pulse for each detected pulse. The pulse detector 15 feeds the Acquisition Module AM, which includes correlator CO' which output triggers to the frame counter FC' and subframe counter SC'. The remainder of the receiver is similar or complementary to the transmitter. In a preferred embodiment, a high-speed counter SC' gates a data latch DL when the counter value matches the current main code value. The high-speed counter SC' wraps around at each frame interval. This wrap increments a frame counter FC', which is used to look up the code commencement in the EPROM 14'. The frame counter FC' wraps around at each superframe interval. The data latch DL' feeds the FEC decoder FEC' and optional decryptor DEC, which operates at the frame rate (about 1 Megabit per second). The receiver design is further described below.

With the use of multiple codes (data rate on demand) the EPROM 14', or phase-shift register, or other means of code generation, will provide more than one code to both the receiver and transmitter.

THE CODES

The wireless communications network can be used in either network or duplex arrangements. Two levels of coding are used in systems of the present invention. the major code is used to time the pulse transmission and allow multiple channels. Additionally, a forward error correction (FEC) code is applied to the informational data before transmission. There is a large choice of error correcting codes (see Cipra, 1994).

The use of orthogonal codes permits the coexistence of multiple channels slaved together in the same superframe of a matched filter. Representative such codes are Quadratic Congruence (QC) codes, Hyperbolic Codes (HC) codes and optical codes (Titlebaum & Sibul, 1981; Titlebaum et al, 1991; Kostic et al, 1991). The discussion of coding requirements will be based on these codes.

The method for generating the placement operators for the QC code family provides a sequence of functions defined over the finite field, $J_p$, where:

$$J_p = \{0,1,2, \ldots, p-1\},$$

and p is any odd prime number. The functions are defined as:

$$y(k;a,b,c) = [ak^2 + bk + c]_{\bmod p}, k \in J_p,$$

where a is any element of $J_p$ except O and b,c are any member of $J_p$. The parameter a is called the family index.

Figure 2:
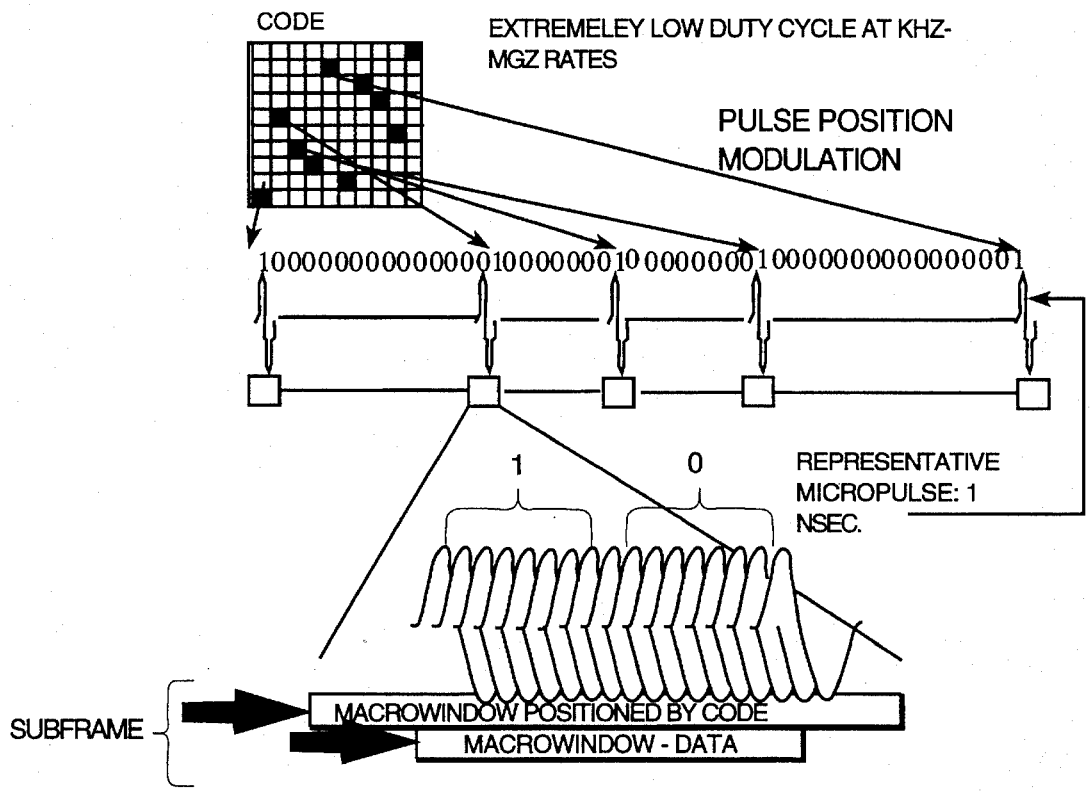
FIG. 2 illustrates frames and subframes in an ultrafast time hopping CDMA wireless communication system incorporated in the invention.

The difference function for the HC codes is the ratio of two quadratic congruences. The denominator polynomial of the ratio cannot have any zeros and the numerator is quadratic and has at most two zeros. Therefore, the HC codes have at most two hits for any subframe or frame shift. A sequence, $u_m(i), i=0,1,2,\ldots,n-1$, which is a member of a time hopping code can be constructed according to a method shown in FIG. 2. For example, pulses received in the first interval of the macro-window signify "1" and those received in the second interval signify "0". The number of bits in the subframe (microwindow) is determined by the precision of the data gate circuitry. Alternatively, the subframe can be used to encode analog information.

Figure 5A:
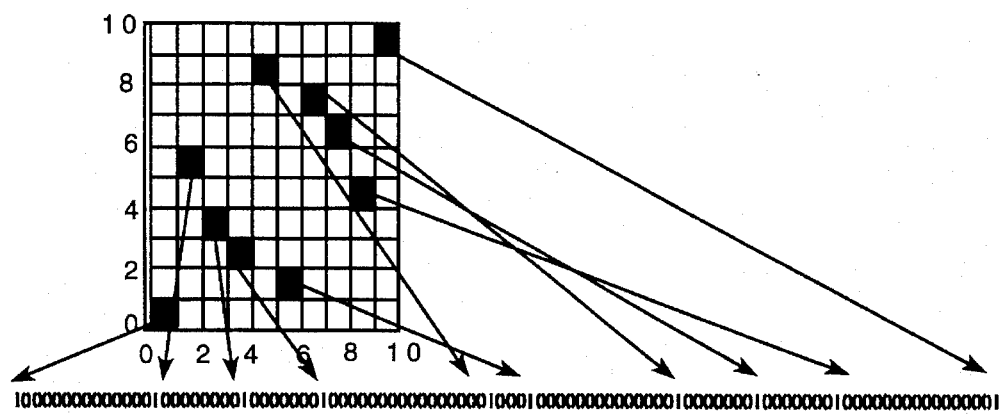
FIGS. 5a, 5b and 5c illustrate two orthogonal codes (FIG. 5a and 5b), and their auto- and cross-correlation (FIG. 5c)
Figure 5B:
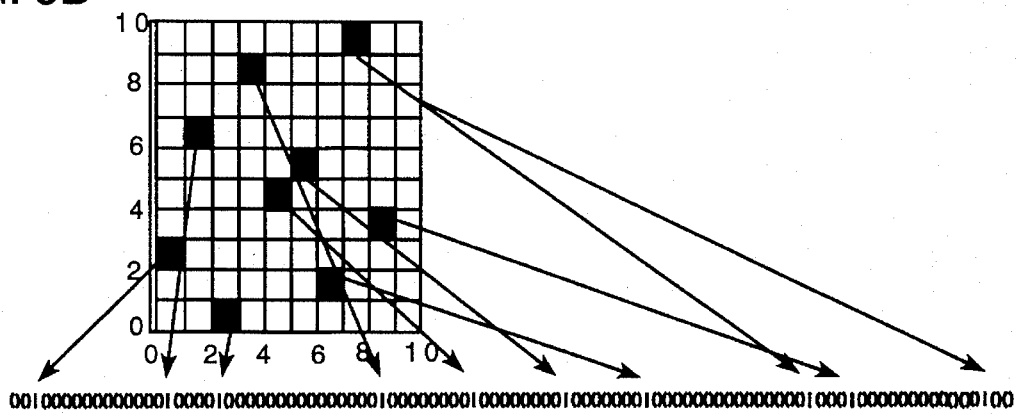
Figure 5C:
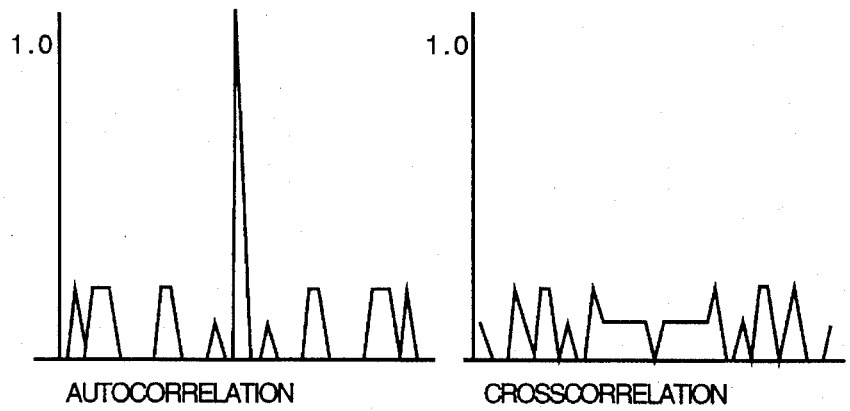

FIG. 5 shows the auto- and cross-correlation of two orthogonal codes. The autocorrelation is excellent indicating excellent transmission/reception capabilities. The crosscorrelation is extremely flat, indicating excellent crosschannel interference rejection.

Figure 6:
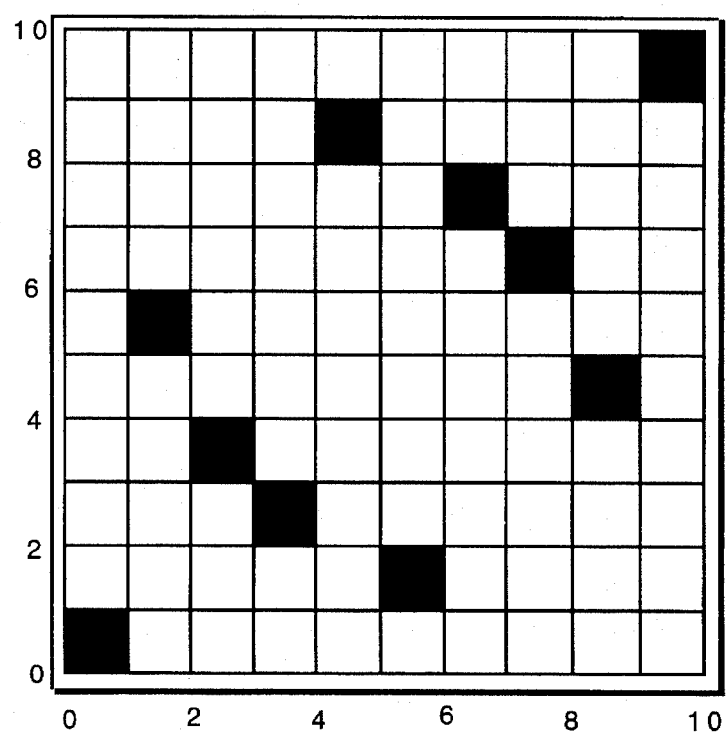
FIG. 6 illustrates a hyperbolic congruence code, p=11, a=1, 10×10 matrix.
Figure 7:
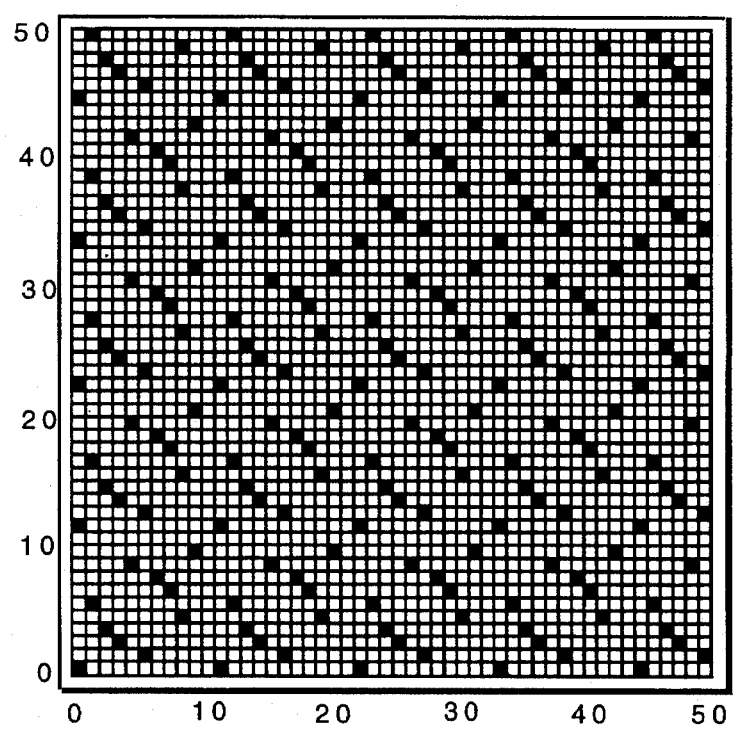
FIG. 7 illustrates a hyperbolic congruence code, p=11, a=1, 50×50 matrix.
Figure 8:
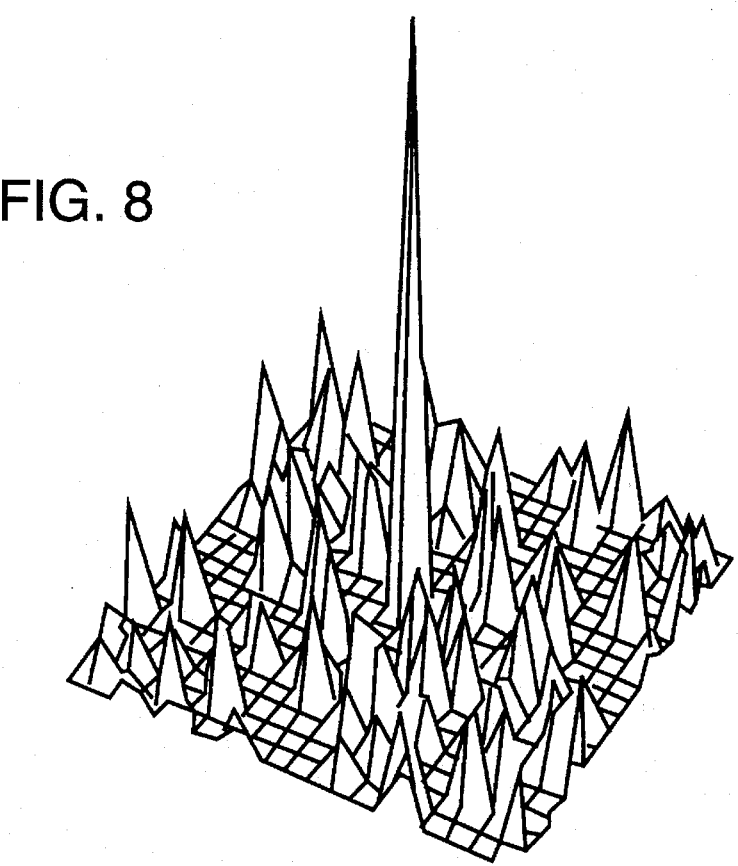
FIG. 8 illustrates the autoambiguity function for the hyperbolic congruence codes, p=11, a=1 and p=11, a=3, 10×10 matrix.
Figure 9:
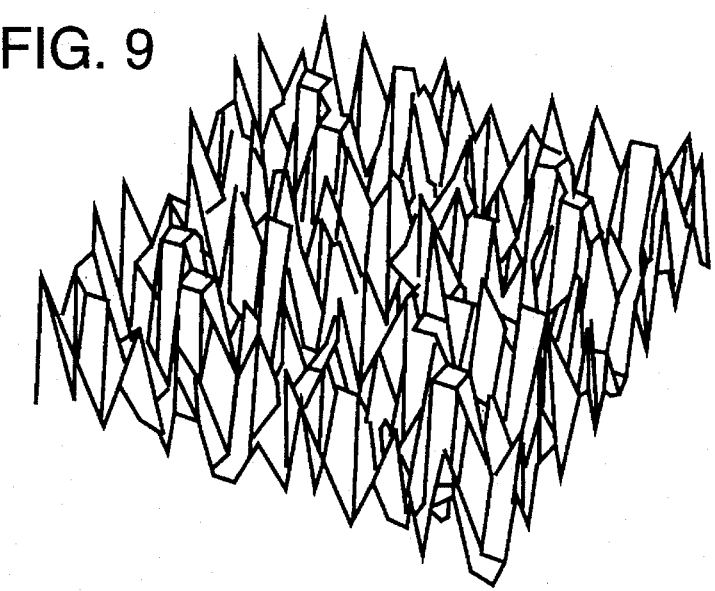
FIG. 9 illustrates the crossambiguity function for the hyperbolic congruence codes, p=11, a=1 and p=11, a=3, 10×10 matrix.

FIG. 6 and FIG. 7 shows two HC codes, p=11, a=1, 10×10 matrix, FIG. 6, and, p=11, a=1, 50×50 matrix, FIG. 7 and FIG. 8 shows the autoambiguity function, for the HCC code, p=11, a=1, 10×10 matrix and FIG. 9 shows the cross-ambiguity function, for the HC codes, -=11, a=1 and p=11, a=3, 10×10 matrix.

The QC codes are defined as:

$$y_a(x) = \left[ a \frac{x(x+1)}{2} \right]_{\bmod p},$$

with $1 \leq a \leq p-1$ and $0 \leq x \leq p-1$ for p×p matrices.

The HC codes are defined as:

$$y_a(x) = i/x \bmod p,$$

where 1/x is the multiplicative inverse in the field $J_p$ and with $1 \leq a \leq p$ and $1 \leq x \leq p$ for p-1×p-1 matrices.

The QC and HC codes, due to Titlebaum and associates (Albicki et al, 1992; Bellegarda & Titlebaum, 1988–1991; Drumheller & Titlebaum, 1991; Kostic et al, 1991; Maric & Titlebaum, 1992; Titlebaum, 1981; Titlebaum 7 Sibul, 1981; Titlebaum et al, 1991), are orthogonal codes for use in the present invention, the ultrafast time hopping CDMA communication systems. Other choices are available in the literature.

The major codes used in systems of the present invention are equally applicable to optical orthogonal coding procedures for fiber optical communications. The use of orthogonal codes permits the coexistence of multiple channels slaved together in the same superframe of a matched filter. For ease of explanation, the following terms are defined in Table 1.

TABLE 1

| | |
|---|---|
| Subframe | The, e.g., ~1 nanosecond interval during which a pulse is transmitted. The pulse is modulated by adjusting its position within the interval to one of two or more possible times. For example, to send one bit per subframe, the pulse may be offset from the center of the subframe by −250 picoseconds for a zero, or +250 picoseconds for a one. |
| Frame | A, e.g., ~1 microsecond, interval, divided into approximately 1000 subframes (or according to the code length). A pulse is transmitted during one subframe out of each frame. The pulse is sent during a different subframe for each frame and according to the code. |
| Superframe | A, e.g, ~1 millisecond, interval, representing one repetition of a code pattern. In the present example, approximately 1000 pulses are transmitted during one superframe, at pseudorandom spacing. |
| Channel | One unidirectional data path using a single orthogonal code. The raw (uncorrected) capacity of one channel using a code of length 1020 is approximately 0.5 mbs. Using all 1020 codes, the channel data rate is approximately 500 mbs. |

An example of the relations between subframe, frame, superframe and channel is given in Table 2 for a code of length 1020, Table 3 for a code of length 508, and Table 4 for a code of length 250.

TABLE 2

| | | |
|---|---|---|
| largest count of code modulation | | 1021 |
| code period | 1021 − 1 | 1020 frames |
| hop slot duration (the subframe) | | 695 picoseconds |
| frame time interval (the frame) | $927 \times 10^{-12} \times 1020$ | 950 nanoseconds |
| time of one complete code period (the superframe) | $1020 \times 950 \times 10^{-9}$ | 0.97 milliseconds |
| fraction of frame time for encoding | $\dfrac{1020 \times 695 \times 10^{-12}}{950 \times 10^{-9}}$ | 0.75 |
| forward error correcting redundancy | | 2 |
| data interval | $2 \times 950 \times 10^{-9}$ | 1.9 microseconds |

TABLE 2-continued

| | | |
|---|---|---|
| data encoding interval subframe | 2 × 695 picoseconds | 1.39 nanoseconds |
| data rate | $\dfrac{1}{1.9 \times 10^{-6}}$ | ~526 kbs |
| data frame subinterval | | 347.5 picoseconds |
| data frame bandwidth | $\dfrac{695}{347.5} = 2$ | 1 bit |
| single channel data rate | 1 × 526 × 10³ | ~526 kbs |
| maximum number of codes | | 1020 |
| multichannel data rate using 10 codes | 10 × 526 × 10³ | 5.26 mbs |
| multichannel data rate using the maximum number of codes | 1020 × 526 × 10³ | 537 mbs |

TABLE 3

| | | |
|---|---|---|
| largest count of code modulation | | 509 |
| code period | 509 − 1 | 508 frames |
| hop slot duration (the subframe) | | 695 picoseconds |
| frame time interval (the frame) | 927 × 10⁻¹² × 508 | 472 nanoseconds |
| time of one complete code period (the superframe) | 508 × 472 × 10⁻⁹ | 0.24 milliseconds |
| fraction of frame time for encoding | $\dfrac{508 \times 695 \times 10^{-12}}{472 \times 10^{-9}}$ | 0.75 |
| forward error correcting redundancy | | 2 |
| data interval | 2 × 472 × 10⁻⁹ | 0.94 microseconds |
| data encoding interval subframe | 2 × 695 picoseconds | 1.39 nanoseconds |
| data rate | $\dfrac{1}{0.94 \times 10^{-6}}$ | ~1059 kbs |
| data frame subinterval | | 347.5 picoseconds |
| data frame bandwidth | $\dfrac{695}{347.5} = 2$ | 1 bit |
| single channel data rate | 1 × 1059 × 10³ | ~1059 kbs |
| maximum number of codes | | 509 |
| multichannel data rate using 10 codes | 10 × 1059 × 10³ | 10.59 mbs |
| multichannel data rate using the maximum number of codes | 509 × 1059 × 10³ | 539 mbs |

TABLE 4

| | | |
|---|---|---|
| largest count of code modulation | | 251 |
| code period | 251 − 1 | 250 frames |
| hop slot duration (the subframe) | | 695 picoseconds |
| frame time interval (the frame) | 927 × 10⁻¹² × 250 | 233 nanoseconds |
| time of one complete code period (the superframe) | 250 × 233 × 10⁻⁹ | 0.06 milliseconds |
| fraction of frame time for encoding | $\dfrac{250 \times 695 \times 10^{-12}}{233 \times 10^{-9}}$ | 0.75 |
| forward error correcting redundancy | | 2 |
| data interval | 2 × 233 × 10⁻⁹ | 0.47 microseconds |
| data encoding interval subframe | 2 × 695 picoseconds | 1.39 nanoseconds |
| data rate | $\dfrac{1}{0.47 \times 10^{-6}}$ | ~2130 kbs |
| data frame subinterval | | 347.5 picoseconds |
| data frame bandwidth | $\dfrac{695}{347.5} = 2$ | 1 bit |
| single channel data rate | 1 × 2130 × 10³ | ~2130 kbs |
| maximum number of codes | | 251 |
| multichannel data rate using 10 codes | 10 × 2130 × 10³ | 21.3 mbs |
| multichannel data rate using the maximum number of codes | 250 × 2130 × 10³ | 533 mbs |

Figure 3:
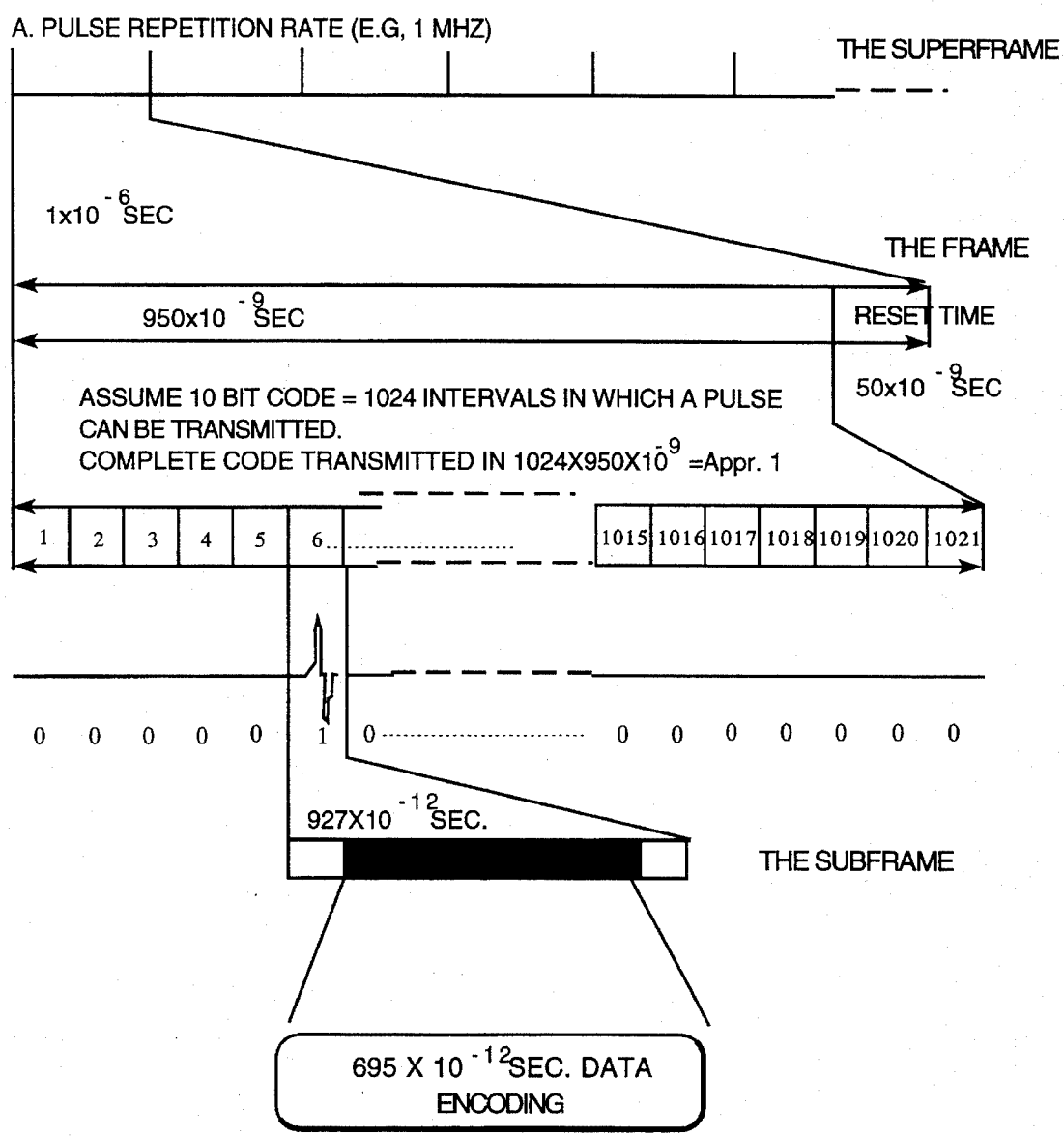
FIG. 3 is a diagrammatic exposition of the subframe, frame and superframe.
Figure 4:
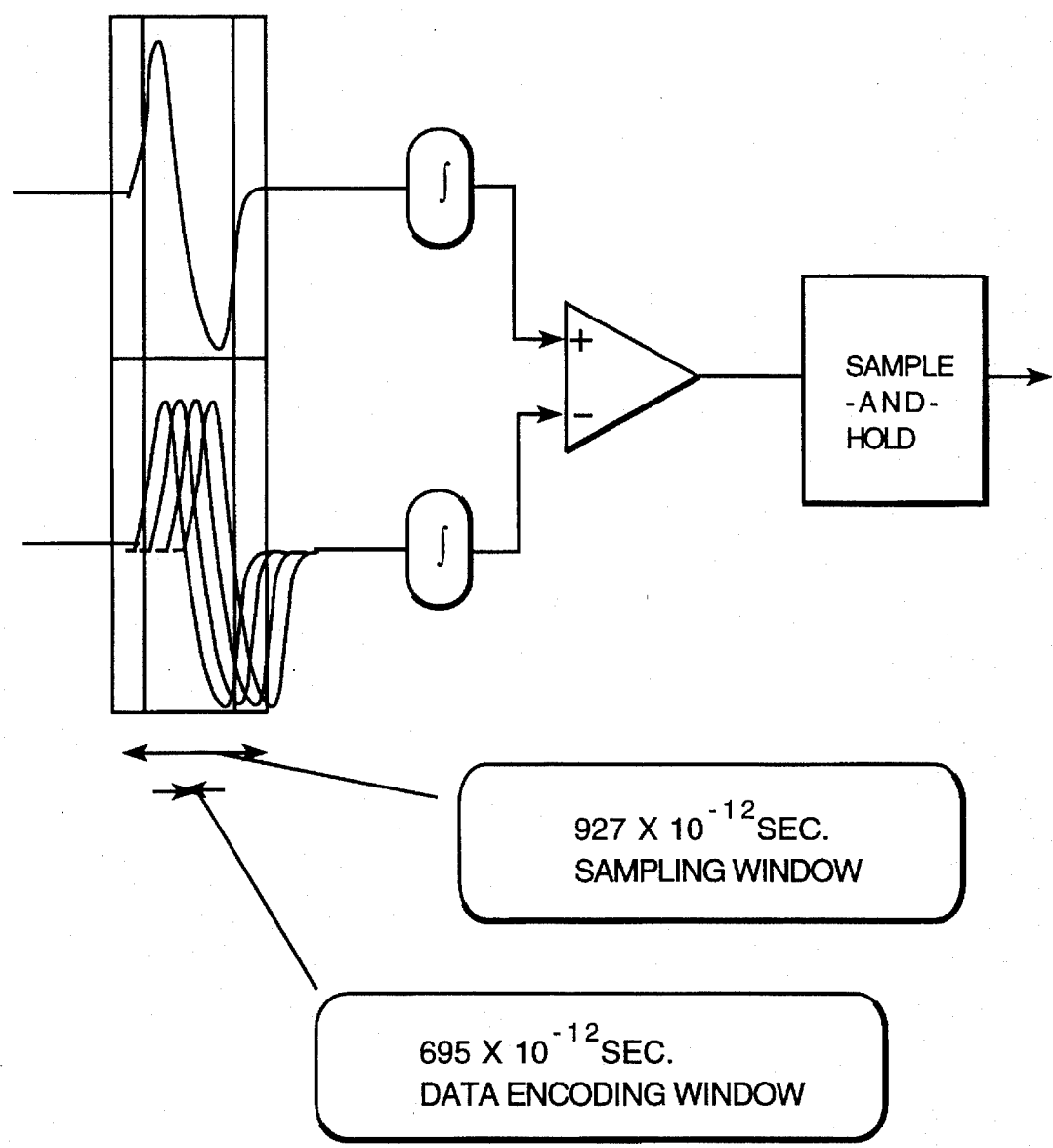
FIG. 4 is a diagrammatic exposition of one method for achieving correlation and subframe sampling.

The subframe, frame and superframe relations are shown in FIG. 3.

THE RECEIVER

In conventional frequency domain heterodyne receivers the mixer is by far the preferred front-end component. In general, mixers are used to convert a low-power signal from one frequency to another by combining it with a higher-power local oscillator (LO) signal in a nonlinear device. Usually, the difference frequency between the RF and LO signals is the desired output frequency at the intermediate frequency (IF) at subsequent IF amplification. Mixing with local oscillators downconverts to intermediate frequencies and in the IF section narrowband filtering is most easily and conveniently accomplished. Subsequent amplification and detection is based on the intermediate frequency signal.

The operation of a detector in the mixing code results in a much lower conversion loss and is the reason for the excellent sensitivity of the superheterodyne receiver. The mixing action is due to a nonlinear transfer function:

$$I = f(V) = a_0 + a_1 V + a_2 V^2 + a_3 V^3, \ldots a_n V^n,$$

where I and V are the receiver current and voltage If $V_{RF} \sin \omega_{RF} t$ is the RF signal and $V_{LO} \sin \omega_{LO} t$ is the LO signal, then the mixing products are:

$$I = a_0 + a_1(V_{RF} \sin \omega_{RF} t + V_{LO} \sin \omega_{LO} t) + a_2(V_{RF} \sin \omega_{RF} t + V_{LO} \sin \omega_{LO} t)^2 + a_3(V_{RF} \sin \omega_{RF} t + V_{LO} \sin \omega_{LO} t)^3, \ldots a_n(V_{RF} \sin \omega_{RF} t + V_{LO} \sin \omega_{LO} t)^n.$$

The primary mixing products come from the second-order term. However, many other mixing products—may be present within the IF passband. Mixing produces not only a new signal but also its image, i.e., $\omega_{LO} \pm \omega_{RF}$. However, in the case of ultrafast time domain signals, which are ultra-wideband, filtering would severely limit the amplitude of the signal and hence its range.

For example, the second-order term for a narrow-band frequency domain signal is:

$$a_2(V_{RF}\sin\omega_{RF}t + V_{LO}\sin\omega_{LO}t)^2$$

but for a broad-band time domain ultrafast signal it is:

$$a_2(V_{RF_1}\sin\omega_{RF_1}t + V_{RF_2}\sin\omega_{RF_2}t + V_{RF_3}\sin\omega_{RF_3}t + V_{RF_i}\sin\omega_{RF_i}t + \ldots V_{LO}\sin\omega_{LO}t)^2$$

The output is then:

$$\sum_{ij} V_{RF_i}\sin\omega_{RF_i}t \cdot V_{RF_j}\sin\omega_{RF_j}t,$$

which possesses too many intermodulation products for use as an IF input.

Therefore, due to the broadband nature of the ultrafast, ultrawideband individual signal, the synchronous (super) heterodyne receiver should not be the choice in receivers of the present invention due to the number of mixing products produced. The receiver of choice for the present invention is a homodyne receiver.

A problem in definition arises in the case of the homodyne receiver. We take our definitions from optical physics (Born & Wolf, 1970; Cummins & Pike, 1974), not from radar engineering. Essentially, the heterodyne method requires a local oscillator to be mixed with the received signal and is a "self-beat" or autocorrelation method. The homodyne method is inherently a coherent method [cf. Born & Wolf, 1970, page 256]. The heterodyne method can be used with autocorrelation methods, e.g., after the mixing operation. The heterodyne method can even use a "coherent" local oscillator, but only with a narrowband signal. The distinguishing features between the two methods are that the homodyne method is a coherent (correlative) signal acquisition method with (a) no restrictions on the bandwidth of the received signal and (b) restrictions on the absolute timing of the signal bandwidth components. Conversely, the heterodyne method is a signal acquisition method with (a) no restrictions on the timing of the received signal and (b) restrictions on the bandwidth of the signal frequency components.

The various definitions of the heterodyne and homodyne methods are not consistent. For example, the IEEE Standard Dictionary of Electronic Terms (Jay, 1988) defines "homodyne reception" as "zero-beat reception or a system of reception by the aid of a locally generated voltage of carrier frequency"; and the McGraw-Hill Dictionary of Science and Technology (Parker, 1989) defines "homodyne reception" as "a system of radio reception of suppressed-carrier systems of radio telephony, in which the receiver generates a voltage having the original carrier frequency and combines it with the incoming signal. Also known as zero-beat reception."

Essentially, these definitions (Jay, 1988; Parker, 1989) refer to the generalized use of homodyning in a receiver with more than one mixing stage. "Synchronous" detection is achieved by a method called "homodyning", which involves mixing with a signal of the same frequency as that being detected either by external or internal (i.e., with a phase loop) methods. Thus, recently the term "homodyne" has come to mean a method for the detection of narrowband signals and for restoring a suppressed carrier signal to a modulated signal.

Clearly the waters have been muddied concerning the definitions of the heterodyne and homodyne methods. However, the original optical physics definitions are specific in equating heterodyning as a method of signal acquisition using a local oscillator, and homodyning as a method of signal acquisition using a coherent method such as autocorrelation. Ultrafast, ultrashort pulse signal acquisition requires the homodyne method because it is a coherent method and preserves timing information. It would not be right to coin new terms, because the present terms continue to survive relatively unambiguously in optical physics from whence they came. Therefore, we shall use the terms in the optical physics sense of those terms, but cautiously recognizing the danger of triggering the wrong associations.

Figure 10A:
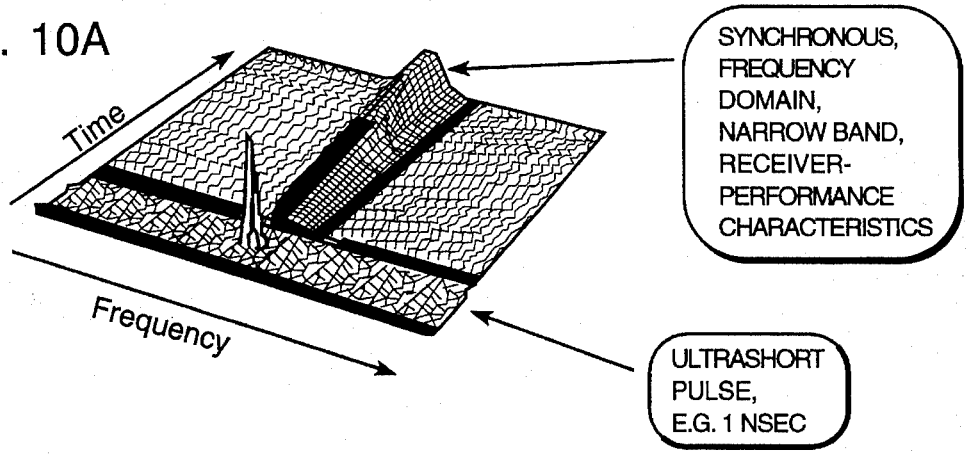
FIG. 10a illustrates a time-frequency representation of an ultrashort pulse of 1 nanosec. and a synchronous (e.g., heterodyne) receiver for a narrow-band sinusoid.
Figure 10B:
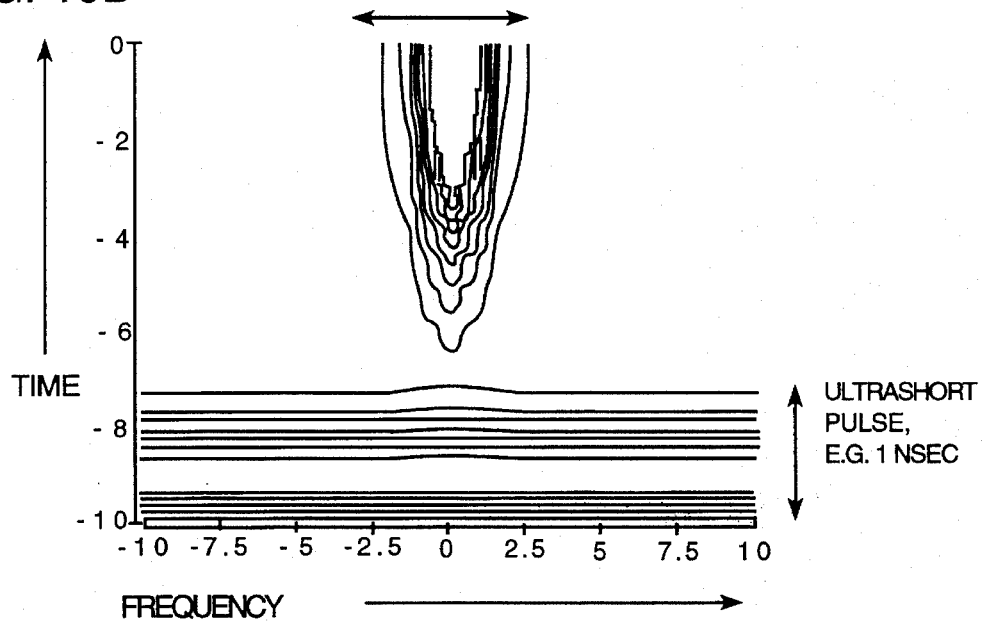

The distinction between homodyne and heterodyne reception is significant and bears on the claims that the present invention is noninterfering to conventional, i.e., heterodyne, receivers. In FIGS. 10a and 10b, is shown both ultrafast, ultrashort pulse homodyne reception and narrow-band synchronous signal heterodyne reception in time-frequency space. FIG. 10a is a time-frequency representation of an ultrashort pulse of 1 nanosec. and a synchronous (e.g., heterodyne) receiver for a narrow-band sinusoid. Looking only from the frequency axis, the (exaggerated) spike of the ultrashort pulse would appear to overlap with the rising ridge of the narrow-band heterodyne receiver, i.e., the heterodyne receiver would appear to receive any of the ultrafast, ultrashort signals. However, looking at the total time-frequency plane representation, it can be seen that the ridge representation of the narrow-band synchronous heterodyne receiver does not extend down to the representation of the ultrafast signal representation. The synchronous, heterodyne receiver takes some time to respond and requires a number of cycles of a signal to receive that signal.

Figure 11:
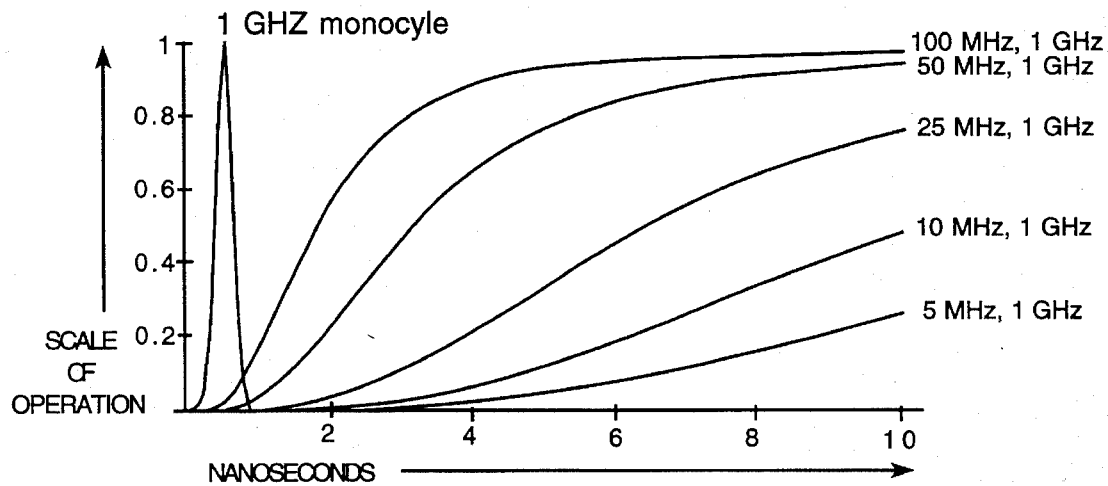
FIG. 11 is a cut through the three-dimensional of FIG. 10.

The distinction between the homodyne reception of the present invention and conventional heterodyne reception is shown in FIG. 11, which is a cut through FIG. 10a and viewed from the time side. The ultrafast, ultrashort pulse signal is shown to be diminished in amplitude for conventional heterodyne receivers of all attack (rise) times, even if the ultrashort signal's average frequency is at the center frequency of the heterodyne receivers. On the other hand, homodyne reception preserves signal amplitude and timing.

THE ACQUISITION SYSTEM

Figure 12:
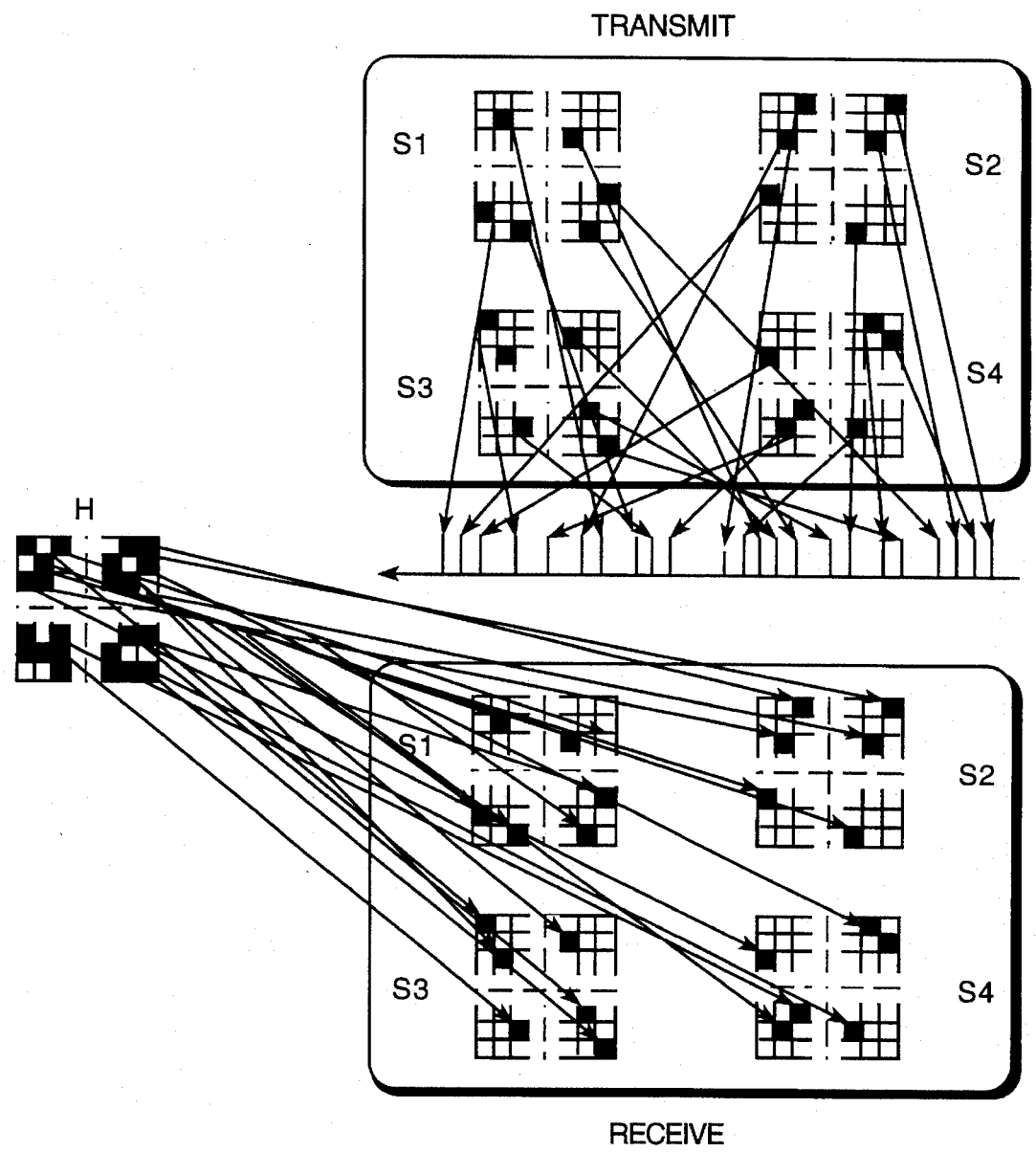
FIG. 12 illustrates an acquisition system according to the invention.

The acquisition system/matched filter of the present invention recognizes multiple codes (channels) over a superframe time period (1 msec. for a 1020 length code). FIG. 12 shows an Acquisition System, H, receiving F wireless signals from four channels $S_1$–$S_4$ in asynchronous wraparound and triggers the receiving system decoding modems, $S_1$–$S_4$.

Figure 13:
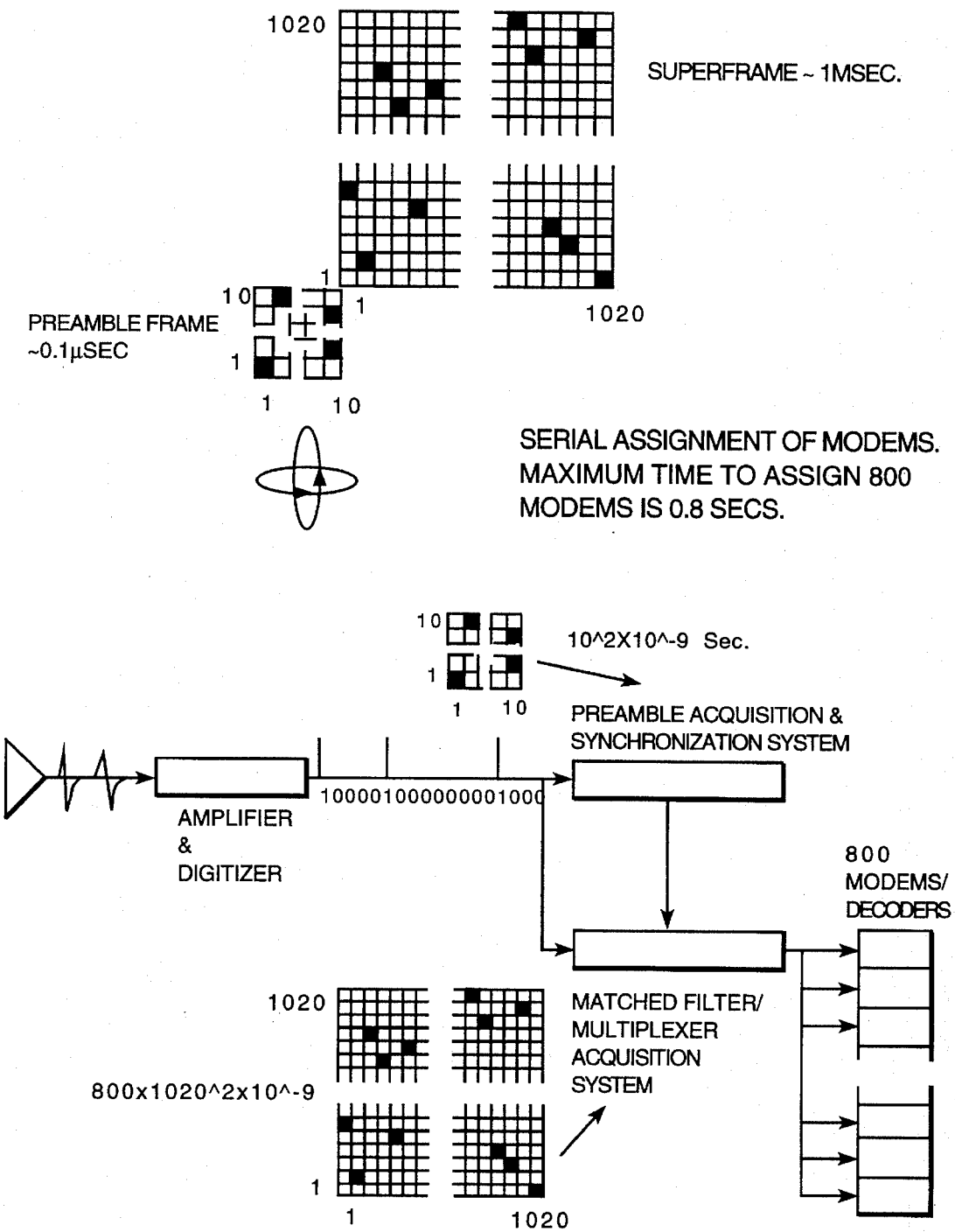
FIG. 13 illustrates a detail of the acquisition system and decode modems.

FIG. 13 shows an embodiment in which the superframe of each transmission, $S_1$–$S_n$, e.g., with codes of length 1020, is preceded by a preamble frame, e.g., of length 10. This preamble must be received in double wraparound for the case in which the channels, $S_1$–$S_n$, are unsynchronized in their transmissions. In this embodiment, the preamble is the same code for all channels, even if unsynchronized, and acts as a synchronization alert to the Acquisition System, which performs recognition of the channel code and assigns a decoding modem. Unlike in the embodiment of FIG. 12, in the embodiment of FIG. 13 the Acquisition System is not functioning in wraparound mode, but is alerted to the beginning of a transmission of a superframe by the preamble, which is in double wraparound.

THE NETWORKS

The network applications of the present invention are diverse and range from high data rate duplex systems, to building-to-building systems, to the linking of optical fiber networks between such buildings, to within building communications, to LANs and WANs, to cellular telephones, to the "last mile" of Global Grid communications, and to "smart highway" applications (Varaiya, 1993) (e.g., intelligent windshields, etc), etc.

APPLICATION AREAS OF THE PRESENT INVENTION

Wireless WANs and LANs;
Personal Communications Networks;
Cellular Telephones;
Building Automation/Security Systems;
Voice communications;
Bridge & Router Networking;
Instrument Monitoring;
Factory Automation;
Remote Sensing of Bar Codes;
Vehicle Location;
Pollution Monitoring;
Extended-Range Cordless Phones;
Video TeleConferencing;
Traffic Signal Controls;
Medical Monitoring and Record Retrieval Applications;
Remote Sensing;
Factory Data Collection;
Vending Machine Monitoring;
"Last Mile" Global Grid Communications.

The present invention includes the following features:

a) Apparatus and methods of ultrafast, ultrashort, ultrawideband pulse transmission.

b) Apparatus and methods of transmitting sequences of such ultrafast, ultrashort, ultrawideband pulses.

c) Apparatus and methods of pulse interval modulating such sequences according to a macro-coded scheme.

d) Methods of pulse interval modulating such sequences within a microwindow of the macrowindow set by the code such that information can be encrypted in that microwindow.

e) Codes stored in matrix form as associative memories and with superframes of received signals matched against the stored codes.

f) Codes which are orthogonal codes and the temporal coding of the sequence of ultrafast, ultrashort, ultrawideband pulses constitutes the carrier for the transmission.

g) A homodyne, not a synchronous heterodyne, receiver.

h) An acquisition system/matched filter/correlators which synchronizes to a superframe transmission and assigns such transmissions to an appropriate decoding modem on the basis of code recognition.

i) Multichannel operation which provides high overall data rate (e.g., 500 mbs for maximum multichannel operation).

The attached paper entitled "Comparison of Communications . . . and disclosure statement" and the paper entitled "Reference" filed herewith are incorporated herein by reference.

Summarizing, according to the invention, an ultrashort pulse time hopping code-division-multiple-access (CDMA) RF communications system in the time frequency domain comprises a transmitter including:

a) a short duration pulse generator for generating a short duration pulse in the picosecond to nano-second range and a controller for controlling the generator, b) code means connected to the controller for varying the time position of each short pulse in frames of pulses in orthogonal superframes of ultrafast time hopping code division multiple access format, c) precise oscillator-clock for controlling such timing, d) encoding modems for transforming intelligence into pulse position modulation form, e) antenna/amplifier system connected to said means for generating for receiving and broadcasting said short duration pulse as a coded broadcast signal, receiver means, said receiver means including:

a) antenna/amplifier system for receiving the broadcast signal, b) homodyne receiver for receiving and decoding the coded broadcast signal, and c) one or more utilization devices connected to the homodyne receiver. The coding means generates sequences of ultrafast, ultrashort, ultrawideband pulses, and an interval modulator for interval modulating the sequences according to a macrowindow encoded format. The macrowindow encoded format set by the assigned code includes microwindows and the pulse interval modulator modulates the position of an individual pulse within a microwindow of each macrowindow set by the code such that information can be encrypted in each of the microwindow. The code means includes codes stored in matrix form as associative memories and with superframes of received signal representing the full assigned code, orthogonal to other assigned codes, matched against the stored codes. Preferably, the codes are orthogonal codes with the temporal coding of the sequence of ultrafast, ultrawideband pulses constituting the carrier for transmission by the antenna system.

The homodyne receiver includes a bank of decoder/modems, an acquisition system/matched filter for synchronizing to a superframe transmission, identifying coded sequencers in the superframe and assigning the transmissions to a selected decoder/modem on the basis of code recognition. The system is adapted for multichannel operation and provides a high overall data rate in the 500 mbs range for maximum multichannel operation.

While preferred embodiments of the invention have been illustrated and described, it will be appreciated that other embodiments, adaptations and modifications of the invention will be readily apparent to those skilled in the art and embraced by the claims appended hereto.

What is claimed is:

1. An ultrashort pulse time hopping code-division-multiple-access (CDMA) RF communications system in the time frequency domain, comprising:

transmitter means, said transmitter means including:
  a) means for generating a short duration pulse in the picosecond to nano-second range and means for controlling said means for generating,
  b) coding means connected to said means for controlling for varying the time position of each said short duration pulse in frames of pulses in orthogonal superframes of ultrafast time hopping code division multiple access format,
  c) precise oscillator-clock means for controlling such timing,
  d) encoding modems for transforming information, voice and data signals into pulse position modulation form,
  e) antenna means connected to said means for generating for receiving and broadcasting said short duration pulse as a coded broadcast signal, receiver means, said receiver means including:
- a) antenna means for receiving said coded broadcast signal, and
- b) homodyne receiver means for receiving and decoding said coded broadcast signal.

2. The communication system defined in claim 1 wherein said coding means includes means for generating sequences of ultrafast, ultrashort, ultrawideband pulses, means for interval modulating said sequences according to an orthogonal code which positions each pulse within a set macrowindow.

3. The communication system defined in claim 2 wherein said macrowindow set by the assigned code includes microwindows and said means for pulse interval modulating, modulates the position of an individual pulse within a microwindow of each macrowindow set by the assigned code such that information is encrypted in each said microwindow.

4. The communication system defined in claim 1 wherein said coding means includes codes stored in matrix form memories and with superframes of received signals representing the assigned code, orthogonal to other assigned codes, matched against said stored codes.

5. The communication system defined in claim 4 wherein said codes are orthogonal codes with the temporal coding of the sequence of ultrafast, ultrashort ultrawideband pulses constituting the carrier for transmission by said transmit antenna means.

6. The communication system defined in claim 4 wherein said homodyne receiver means includes a bank of decoder/modems, an acquisition system/matched filter for synchronizing said orthogonal superframe for transmission, identifying coded sequences in the superframe by said acquisition/matched filter and assigning said superframe transmissions to a selected decoder/modem.

7. The communication system defined in claim 1 which is adapted for multichannel operation and which provides a high overall data rate for maximum multichannel operation.

8. The RF communication system defined in claim 1, comprising means for increasing the number of orthogonal codes available wherein the number (N) of orthogonal codes available comprising a first family of codes, the number (Y) of orthogonal codes available to a second family of codes, and the number (N) of orthogonal codes available to an n'th family, means entraining said families, and using matched filter acquisition such that the total number of codes available is x X y X . . . X N, wherein X is the number of codes in the first family; Y is the number of codes in the second family, and N is the number of codes in the n'th family.

9. The RF communication system defined in claim 1, comprising means for increasing the number of orthogonal codes available wherein the clock rate for a first set of "a" orthogonal codes is A cycles/sec, the clock rate for a second set of "b" orthogonal codes is B, and the clock rate for an n'th set of "n" orthogonal codes is N, then by clock syncopation, and means including separate matched filters at clock rates A, B, . . . N, the total number of codes available is a+b+ . . . +n, where "a" is the number of codes in the first set; "b" is the number of codes in the second set; . . . and "n" is the number of codes in the 'n'th' set; A is the first clock rate; . . . N is the "n"th clock rate, if the matched filter outputs are not entrained, and a X b X . . . X n if the matched filter outputs are entrained.

10. A transmitter for ultrashort pulse time hopping code-division-multiple-access (CDMA) RF communications system in the time frequency domain, comprising:
- a) a short duration pulse generator means for generating a short duration pulse in the picosecond to nano-second range and means for controlling said short duration pulse generator,
- b) a coding unit connected to said means for controlling for varying the time position of each said short duration pulse in frames of pulses in orthogonal superframes of ultrafast time hopping code division multiple access format,
- c) a precise oscillator-clock for controlling such timing,
- d) encoding modems for transforming information, voice and data signals into pulse position modulation form, and
- e) an antenna connected to said short duration pulse generator for receiving and broadcasting said short duration pulse as a coded broadcast signal.

* * * * *